US012027793B2

(12) United States Patent
Huynh

(10) Patent No.: US 12,027,793 B2
(45) Date of Patent: Jul. 2, 2024

(54) CONNECTOR ASSEMBLY HAVING A TERMINAL POSITION ASSURANCE (TPA) DEVICE THAT IS CAM ACTUATED BY A SEAL RETAINER, AND A METHOD FOR OPERATING THEREOF

(71) Applicant: J.S.T. CORPORATION, Farmington Hills, MI (US)

(72) Inventor: Minh Thuong Huynh, Singapore (SG)

(73) Assignee: J.S.T. CORPORATION, Farmington Hills, MI (US)

( * ) Notice: Subject to any disclaimer, the term of this patent is extended or adjusted under 35 U.S.C. 154(b) by 140 days.

(21) Appl. No.: 17/864,277

(22) Filed: Jul. 13, 2022

(65) Prior Publication Data

US 2023/0246384 A1 Aug. 3, 2023

Related U.S. Application Data

(60) Provisional application No. 63/305,036, filed on Jan. 31, 2022.

(51) Int. Cl.
*H01R 13/436* (2006.01)

(52) U.S. Cl.
CPC ................................ *H01R 13/4362* (2013.01)

(58) Field of Classification Search
None
See application file for complete search history.

(56) References Cited

U.S. PATENT DOCUMENTS 5,116,236 A 5/1992 Colleran
5,571,030 A 11/1996 Gladd
6,361,341 B1 * 3/2002 Okayasu .......... H01R 13/62933 439/271
7,416,426 B2 * 8/2008 Tyler ................ H01R 13/62922 439/157

(Continued)

FOREIGN PATENT DOCUMENTS

EP 1335456 A2 8/2003

OTHER PUBLICATIONS

International Search Report for International Application No. PCT/US2022/037378 dated Dec. 8, 2022 (5 sheets).

*Primary Examiner* — Ross N Gushi
(74) *Attorney, Agent, or Firm* — Kratz, Quintos & Hanson, LLP

(57) ABSTRACT

The connector assembly includes a terminal position assurance (TPA) device, and a seal retainer. A downwardly extending protrusion member of the seal retainer engages with a recess on an upper surface of an upper portion of the TPA device to form a cam linkage mechanism or a cam mechanical linkage for the TPA device and the seal retainer. The seal retainer, when pushed or inserted towards an outer housing, by way of the cam linkage mechanism with the TPA device, pushes the TPA device to one side such that the terminals within the outer housing remain unlocked. The seal retainer, when further pushed or inserted toward the outer housing, by way of the cam linkage mechanism, moves the TPA device laterally to an opposite side such that the TPA device blocks the terminals within the outer housing. A lower portion of the seal retainer is, at a pre-lock or full-lock position, engaged with mating locking members at a bottom portion of a terminal guidance member.

21 Claims, 19 Drawing Sheets

(56) References Cited

U.S. PATENT DOCUMENTS

| | | | |
|---|---|---|---|
| 9,917,381 | B1 | 3/2018 | Campbell |
| 10,673,169 | B2 | 6/2020 | Jabrane |
| 10,892,579 | B2 | 1/2021 | Demaratos |
| 10,923,847 | B2 | 2/2021 | Demaratos |
| 11,133,619 | B2 | 9/2021 | Demaratos |
| 11,245,218 | B2 | 2/2022 | Demaratos |
| 2007/0224888 | A1 | 9/2007 | Tyler |
| 2017/0338600 | A1 | 11/2017 | Tanaka |
| 2018/0316131 | A1 | 11/2018 | Holub |

* cited by examiner

RELEVANT ART

RELEVANT ART

RELEVANT ART

RELEVANT ART

RELEVANT ART

RELEVANT ART

RELEVANT ART

CONNECTOR ASSEMBLY HAVING A TERMINAL POSITION ASSURANCE (TPA) DEVICE THAT IS CAM ACTUATED BY A SEAL RETAINER, AND A METHOD FOR OPERATING THEREOF

CROSS-REFERENCE TO RELATED APPLICATION

This patent application claims priority to U.S. Provisional Patent Application No. 63/305,036 filed Jan. 31, 2022, which is hereby incorporated herein by reference in its entirety.

BACKGROUND OF THE INVENTION

A male terminal position assurance (TPA) device for a connector owned by the Assignee (J.S.T. CORPORATION) of this case is shown, as relevant art, in FIGS. 1A-3B, and described in U.S. Pat. No. 10,923,847 (and related U.S. Pat. No. 11,245,218). In FIG. 1A, the male TPA device 1 of the relevant art includes an upper member 3 and a lower member 5. The upper member 3 has a substantially wing-like shape having sides 10, 14. The lower member 5 includes a flexible arm member 18 in a front portion thereof. The flexible arm member 18 includes a lower protruding member or lower nub member 21, and an upper protruding member or an upper nub member 22. A substantially elongated slot 25 passing through the lower member 5 is located adjacent the flexible arm member 18. The substantially elongated slot 25 being adjacent to the flexible arm member 18 provides the necessary flexibility for the flexible arm member 18. An upper front portion 11 of the flexible arm member 18 is, as shown in FIG. 1A, at an incline. Also, a lower front portion 12 of the flexible arm member 18 is, as shown in FIG. 1A, at an incline. The upper member 3 of the male TPA device 1 is best shown in FIG. 1B as having a wing-like shape. Further illustrated in FIG. 1B are end members 24, 26 extending substantially downward from the sides 10, 14, respectively. Also extending substantially downward from the sides 10, 14 are intermediate members 28, 29, respectively. Each intermediate member 28, 29 has a corresponding nub 31, 33, respectively, extending downward therefrom.

The male TPA device 1 is shown in FIG. 2 as being inserted through an opening 8 passing through an upper portion of a male inner housing 30, and fitted or installed, in the male inner housing 30, at a pre-lock position. At a full-lock position, the male TPA device is slid or pushed down, from the pre-lock position, through the opening 8 of the upper portion of the male inner housing 30.

With respect to the function of the male TPA device 1 when slid or inserted down towards the male inner housing 30, as illustrated in FIG. 3A, a terminal 65 having a leading end 68 is fully inserted or installed inside the male inner housing 30 for allowing the corresponding intermediate member 28, 29, and the corresponding nub 31, 33 of the male TPA device 1 to be fitted or accommodated within a corresponding slot 72 of the corresponding terminal 65. As further shown in FIG. 3A, an upward extending nub 70 at a lower portion inside the male inner housing 30 with a ramp-like rear edge 73 is snapped towards the inside of a notch 72 at a lower portion of the terminal 65 when the terminal 65 is inserted into the male inner housing 30. The ramp-like rear edge 73 of the upward extending nub 70 allows for easy insertion of the terminal 65 into the male inner housing 30, until such time as the upward extending nub 70 at the lower portion inside the male inner housing 30 snaps inside the notch 72 at the lower portion of the terminal 65, which locks (i.e., the primary locks for the terminals 65 inside the male inner housing 30) the terminal 65 and prevents the terminal 65 from being pulled out from the male inner housing 30. FIG. 3A further clearly shows the terminal 65 fully inserted inside the male inner housing 30, which consequently aligns the corresponding slot 72 of the corresponding terminal 65 beneath a corresponding one of the intermediate members 28, 29 (with a corresponding one of the nubs 31, 33) of the male TPA device 1, thereby allowing the corresponding one of the intermediate members 28, 29 (with a corresponding one of the nubs 31, 33) to be accommodated or inserted within the corresponding slot 72 of the corresponding terminal 65 when the male TPA device 1 is pushed downward. Shown in FIG. 3A is the male TPA device 1 in a pre-lock position with the corresponding one of the intermediate members 28, 29 ready to be inserted or accommodated inside the corresponding slot 72 of the corresponding terminal 65 in the event that the male TPA device 1 is inserted or pushed further downward at full-lock position.

Illustrated in FIG. 3B is the male TPA device 1 at full-lock position. As shown, the male TPA device 1 has further been slid or pushed downward from pre-lock position (see FIG. 3A) to full-lock position (see FIG. 3B) with the corresponding one of the intermediate members 28, 29 of the male TPA device 1 having been fully slid or inserted or accommodated within the corresponding slot 72 of the corresponding terminal 65. Consequently, with the male TPA device 1 in full-lock position inside the male inner housing 30, the terminal 65 cannot be pulled away from the male inner housing 30 (i.e., the secondary locks for the terminals 65 inside the male inner housing 30).

Shown in FIG. 3C are the protruding members or nub members 20 of the flexible arm member 18 in engagement with a protruding member or nub member 50 inside the male inner housing 3. As further shown in FIG. 3C, a lower protruding member or nub member 21 of the flexible arm member 18, upon the lower member 5 of the male TPA device 1 being pushed in the downward direction, bypasses and travels towards beneath the protruding member or nub member 50 of the male inner housing 30. At this time, the lower member 5 or the male TPA device 1 is at a pre-lock position inside the male inner housing 30. Further illustrated in FIG. 3C is an arrow passing along the upper groove 40 through which a working device (not shown) is inserted and pushed towards the inclined upper front portion 11 of the flexible arm member 18 upon which the central member 23 is pushed downward, and in turn, the male TPA device 1 is pushed downward, until, as described earlier, the lower protruding member or lower nub member 21 of the flexible member 18 passes and travels towards beneath the protruding member or nub member 50 of the male inner housing 30 so that the lower member 5 or the male TPA device 1 is at a pre-lock position inside the male inner housing 30. When the working device (not shown) is further inserted and pushed towards the inclined upper portion 11 of the flexible arm member 18, along the upper elongated groove 40 of the male inner housing 30 (see arrow in FIG. 3C), the central member 23 of the male TPA device 1 is further pushed downward so that the upper protruding member or upper nub member 22 of the flexible arm 18 travels towards beneath the protruding member or nub member 50 of the inner housing 30 so that the lower member 5 or the male TPA device 1 is at a full-lock position inside the male inner housing 30. The lower member 5 or the male TPA device 1 being in a full-lock position, within the male inner housing 30, is shown in FIG. 3D.

The TPA device 1 is designed to be locked by a hand tool that moves in the direction as shown in the arrow in FIG. 3C. That is, the TPA device 1 is actuated by applying a force approximately 90 degrees (or perpendicular to) the direction of the motion of the TPA device 1 as it moves from the unlocked position to the locked position. As noted above, the TPA device 1 described in U.S. Pat. No. 10,923,847 (and related U.S. Pat. No. 11,245,218) exemplify a CAM motion linkage mechanism in operating its TPA device 1 from the unlocked position to the locked position. The connector assembly in this related art requires the use of a hand tool to lock and unlock the TPA device 1; and although employs a CAM motion (by actuating the TPA device with a hand tool by applying a force approximately 90 degrees (or perpendicular to) to the direction of motion of the TPA device 1 as it moves from the unlocked position to the locked position, the connector assembly of this related art does not use a component integral to the connector assembly.

On the other hand, the TPA device 100 of this invention, unlike the male TPA device of the relevant art, is activated by a secondary component (for example, an interface (or ring) seal retainer), which is part of the connector assembly, as more fully discussed below. Moreover, as further discussed below, the TPA device 100 of this invention, unlike the connector assembly of the above-described related art, locks on a surface or an edge (rather in the body) on a terminal guidance member or a tab terminal.

Additional disclosures of TPA devices are known, as more fully discussed below. In European Patent No. 1 335 456, the TPA device described therein is designed to be locked by a human finger, and is actuated by applying a force in the direction of (or parallel to) the direction of motion as the TPA device moves from an unlocked position to a locked position.

The TPA device disclosed in U.S. Pat. No. 10,673,169 is designed to be locked by a human finger or a hand tool, and is similarly actuated by applying a force in the direction of (or parallel to) the direction of motion as the TPA device moves from an unlocked position to a locked position.

The TPA device described in U.S. Pat. No. 9,917,381 is similarly designed to be locked by a human finger. It is similarly actuated by applying a force in the direction of (or parallel to) the direction of motion as the TPA device moves from an unlocked position to a locked position.

In U.S. Pat. No. 11,133,619 (and related U.S. Pat. No. 10,892,579), the TPA device disclosed therein is designed to be locked by a hand tool, although, as in the above-described TPA device of the related art, similarly actuated by applying a force in the direction of (or parallel to) the direction of motion as the TPA device moves from an unlocked position to a locked position.

In other words, the above-discussed TPA device, as described in each of the European Patent No. 1 335 456; U.S. Pat. Nos. 10,673,169; 9,917,381; and 11,133,619 (and related U.S. Pat. No. 10,892,579), is designed so as to be actuated by applying a force in the direction of (or parallel to) the direction of motion as the TPA device moves from an unlocked position to a locked position; and thus, does not operate with a CAM motion locking mechanism when moving from the unlocked position to the locked position.

SUMMARY OF THE INVENTION

The connector assembly includes a terminal position assurance (TPA) device, and a seal retainer. The seal retainer includes an upper portion that has a centrally extending portion, which has at an end thereof, a downwardly extending protrusion member. The downwardly extending protrusion member engages with a recess on an upper surface of an upper portion of the TPA device to form a cam linkage mechanism or a cam mechanical linkage resulting in a cam linkage motion between the TPA device and the seal retainer. The seal retainer, at an initial state, remains at a position such that the downwardly extending protrusion member, which engages with the recess on the upper surface of the upper portion of the TPA device, similarly remains at an initial position within the recess, and the seal retainer may be pre-locked at a bottom portion thereof. At such a state, the TPA device with the terminals within an inner housing may remain unlocked or at a pre-lock position.

When the seal retainer is further pushed or inserted into an outer housing, the downwardly extending protrusion member of the seal retainer, within the recess of the TPA device moves along the recess and at a position such that TPA device linearly moves towards an opposite side outside of the inner housing and blocks the terminals within a terminal guidance member within the inner housing from being pulled out or dislocated. At such a state, the terminals within the inner housing become locked and at a full-lock position by the TPA device. The terminals may then remain at a full-lock position when the terminals are blocked by the TPA device or when the seal retainer becomes lockingly engaged or full-locked at a bottom portion thereof.

BRIEF DESCRIPTION OF THE DRAWINGS

FIG. 1A is a perspective view of a terminal position assurance (TPA) device of the relevant art, while

FIG. 3A shows a cross-sectional view of the connector of the relevant art illustrating the TPA device of FIGS. 1A and 1B being inserted or pushed into the inner housing at a pre-lock position, while

FIG. 5A is a top perspective view of a seal retainer of this invention, while

FIG. 6A is a top perspective view of a TPA device of this invention showing a substantially oblong recess on an upper surface thereof, which is also a part of the CAM linkage mechanism in the operation of the connector assembly of this invention, while

FIG. 9A shows an internal view illustrating the relative locations of the terminals, the downwardly extending protrusion member of the seal retainer, and the TPA device with the terminals at a pre-lock position, while

DETAILED DESCRIPTION OF THE PREFERRED EMBODIMENTS

Figure 1A:
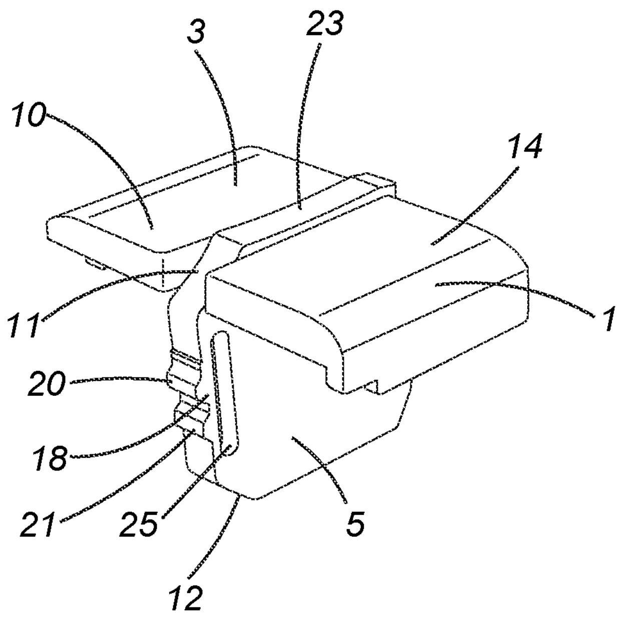
Figure 1B:
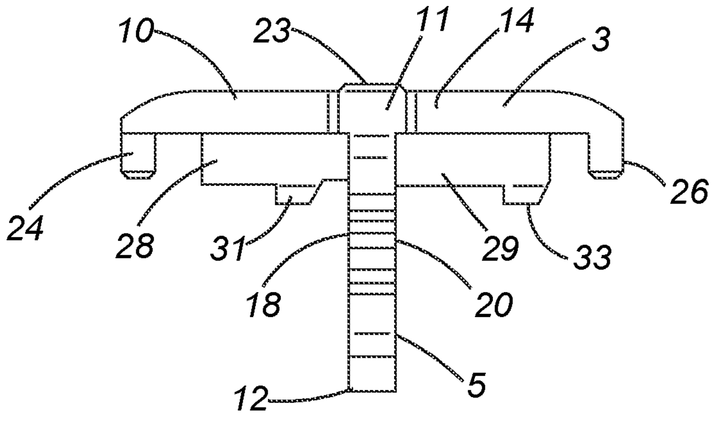
FIG. 1B is a front elevational view of the TPA device of FIG. 1A.
Figure 2:
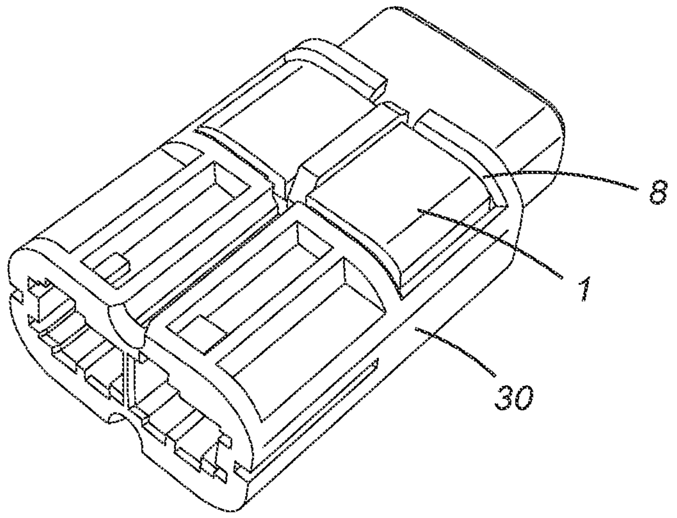
FIG. 2 is a perspective view of an inner housing of the relevant art showing an opening passing through an upper portion of the inner housing through which the TPA device of FIGS. 1A and 1B is inserted or pushed into.
Figure 3A:
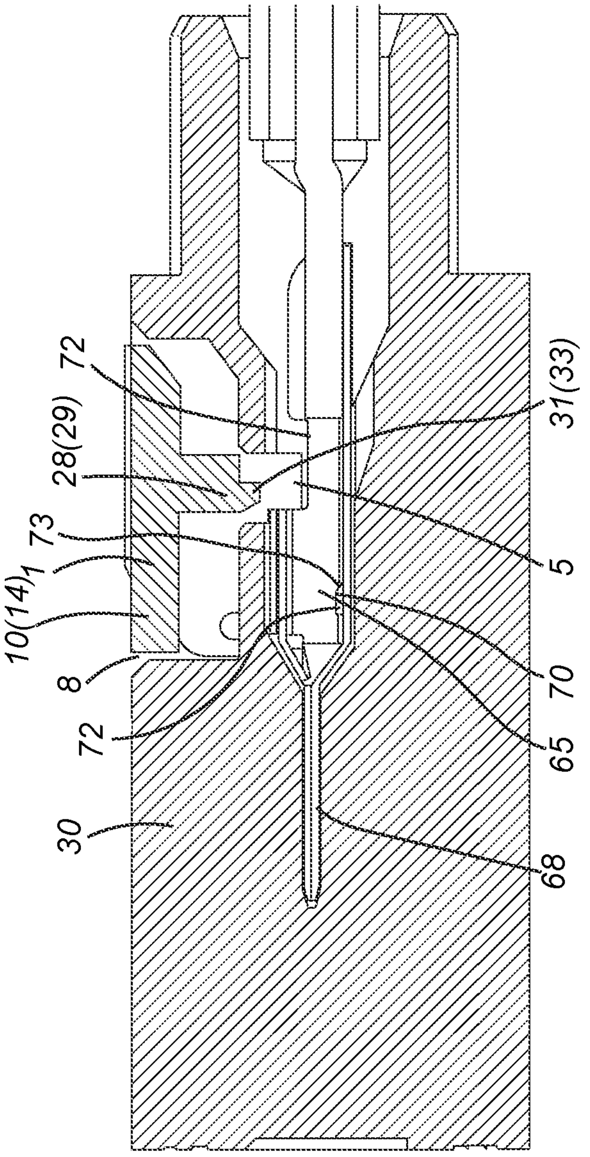
Figure 3B:
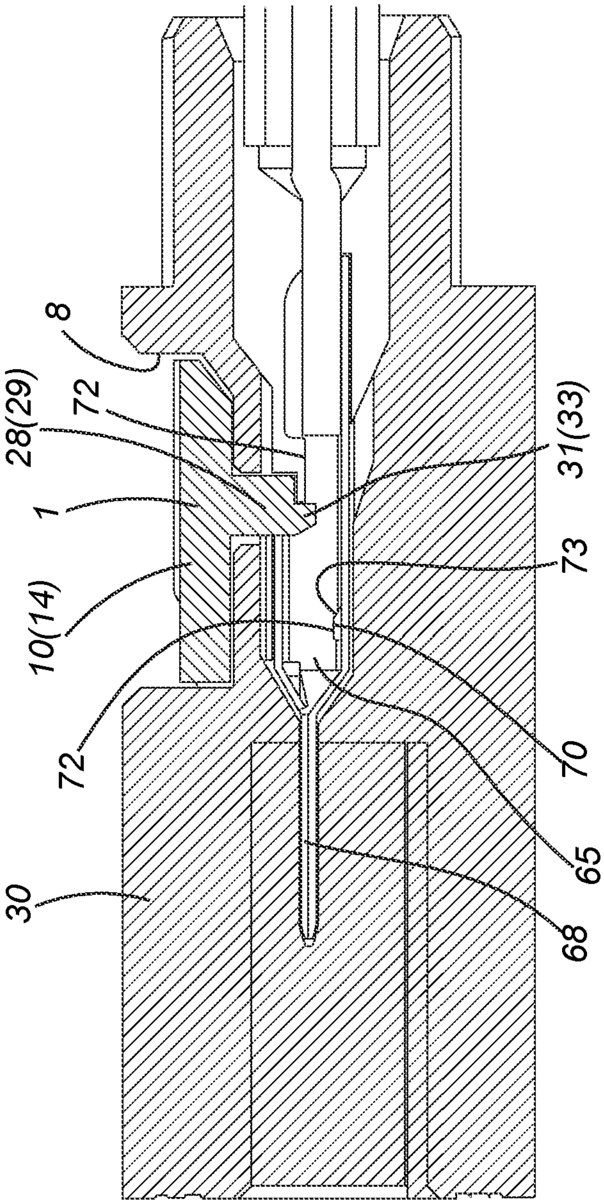
FIG. 3B shows a cross-sectional view of the connector of the relevant art illustrating the TPA device of FIGS. 1A and 1B being inserted or pushed into the inner housing at a full-lock position.
Figure 3C:
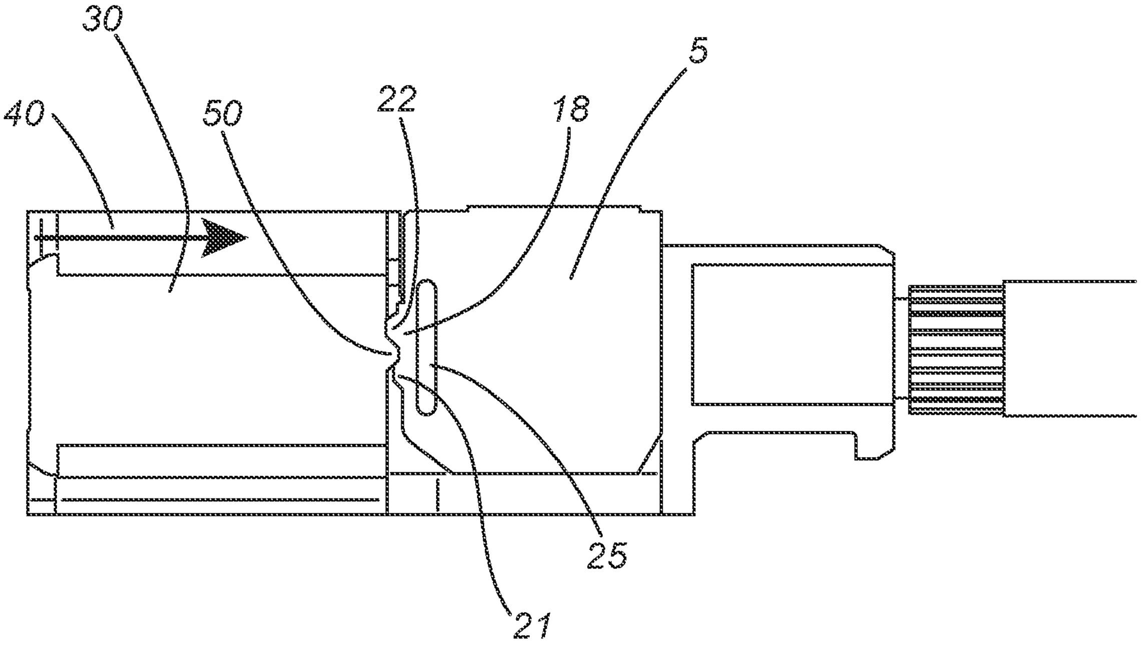
FIG. 3C shows a lower member of the TPA device of the relevant art in a pre-lock position inside a male inner housing and actuated by a tool force approximately perpendicular to the direction of the motion of the TPA device as it moves from a pre-lock position to a full-lock position.
Figure 3D:
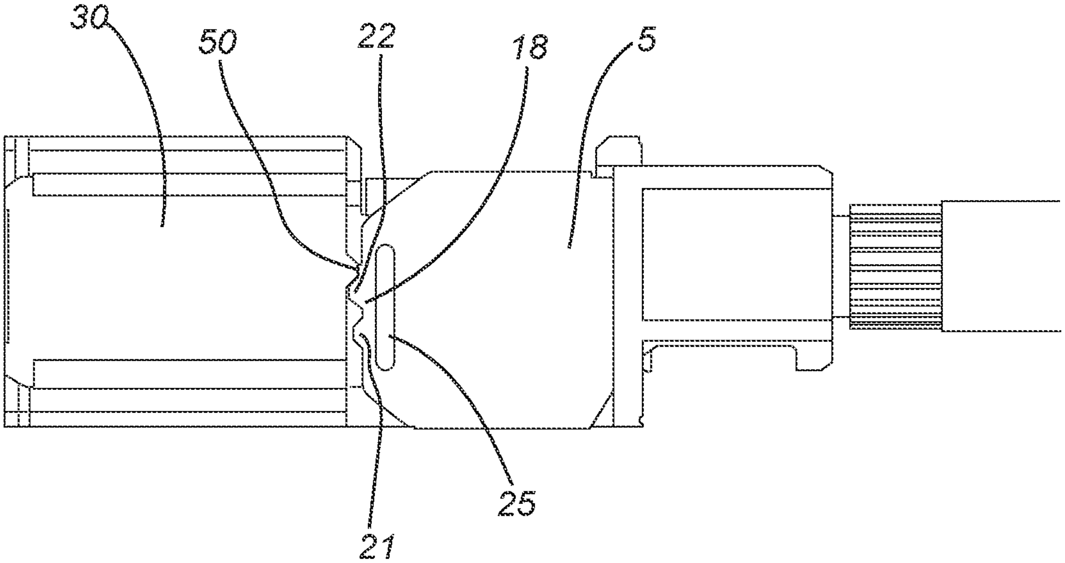
FIG. 3D shows the lower member of the TPA device of the relevant art in a full-lock position inside the male inner housing having moved therein by the above-mentioned tool force.
Figure 4:
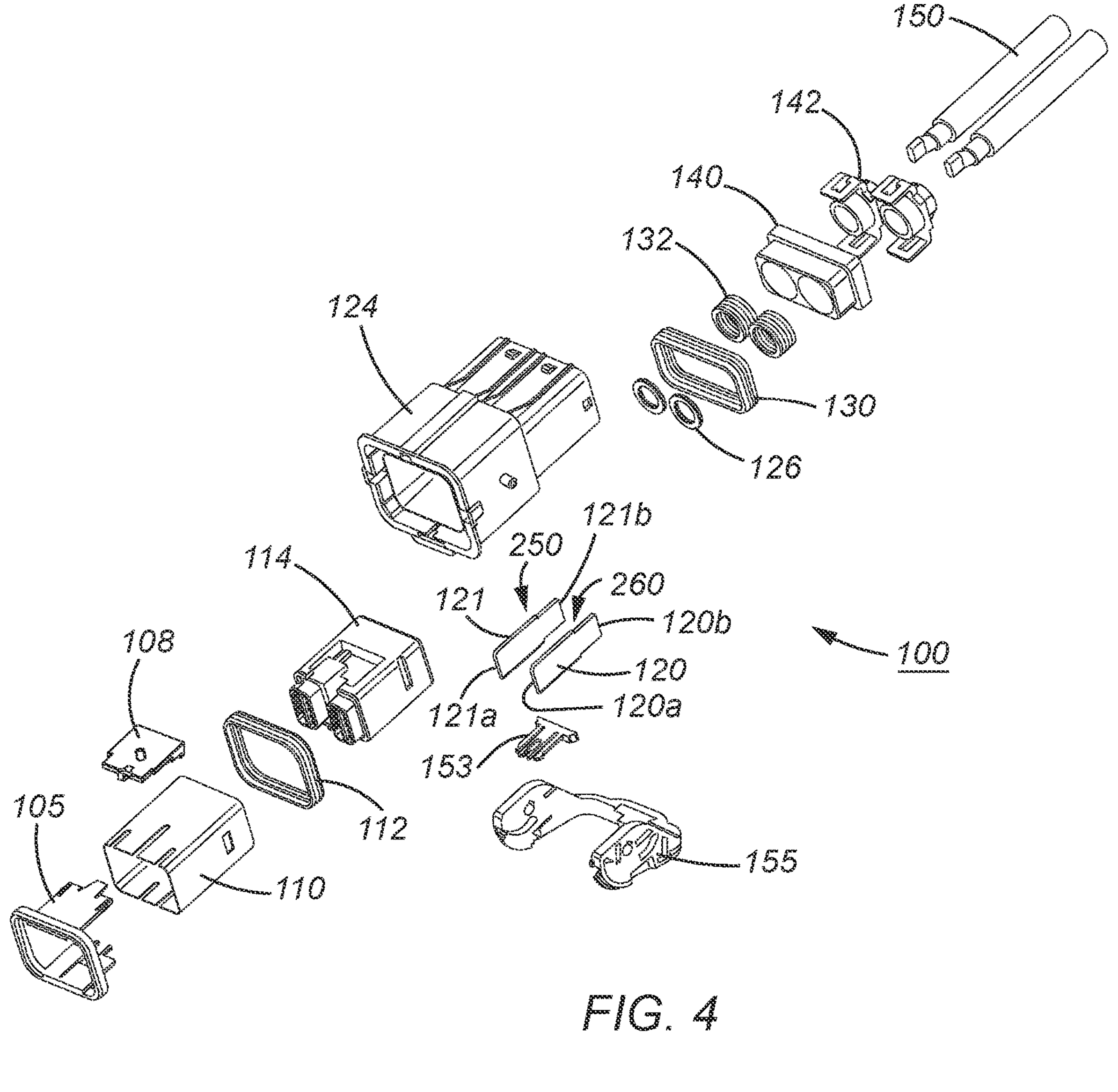
FIG. 4 is an exploded view of a connector assembly of this invention showing various parts or elements thereof, including a terminal position assurance (TPA) device that is CAM actuated by a seal retainer and locks, and locks, either pre-lock or full-lock, at a bottom thereof.

FIG. 4 is an exploded view of the connector assembly of this invention, generally referred to as reference number 100, showing various parts or elements thereof, including a terminal position assurance (TPA) device 108 that is CAM actuated by a seal retainer (preferably, a secondary seal retainer) 105, an inner housing 110, a seal 112, a terminal guidance member 114, terminals 120, 121, an outer housing 124, gaskets 126, seals 130, 132, cable guide members 140, 142, cables 150, and connecting members 153, 155.

Figure 5A:
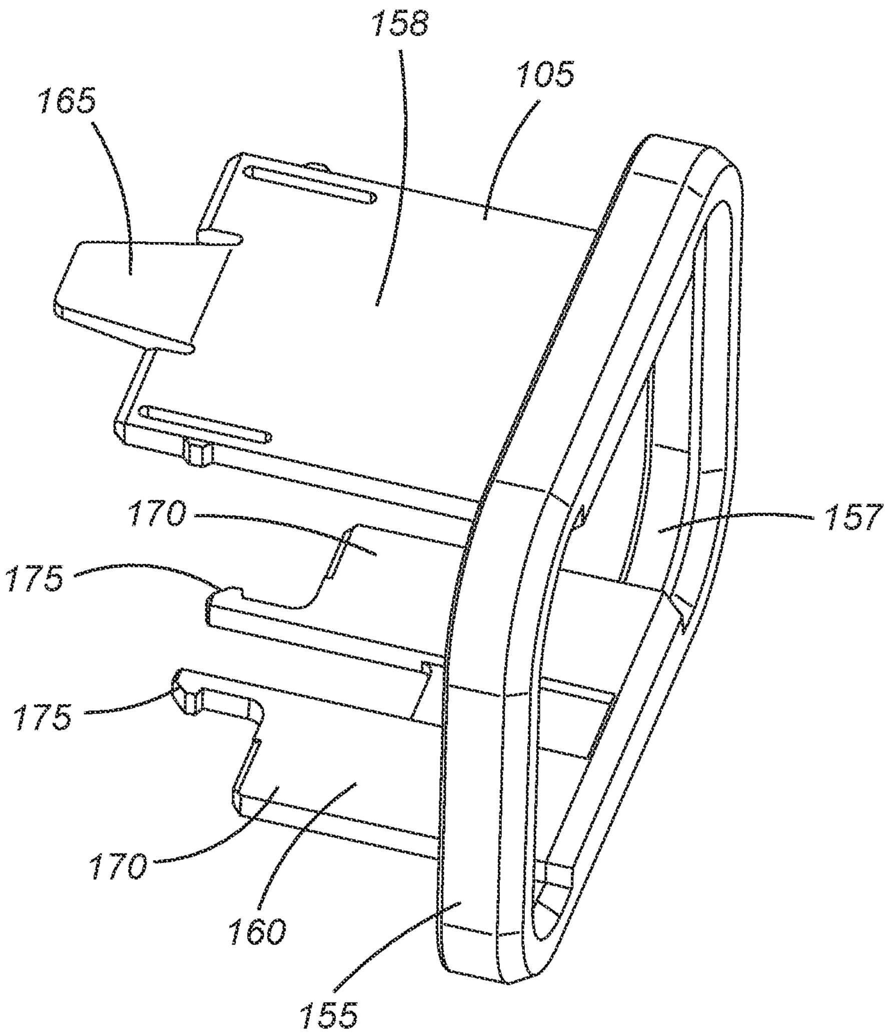
Figure 5B:
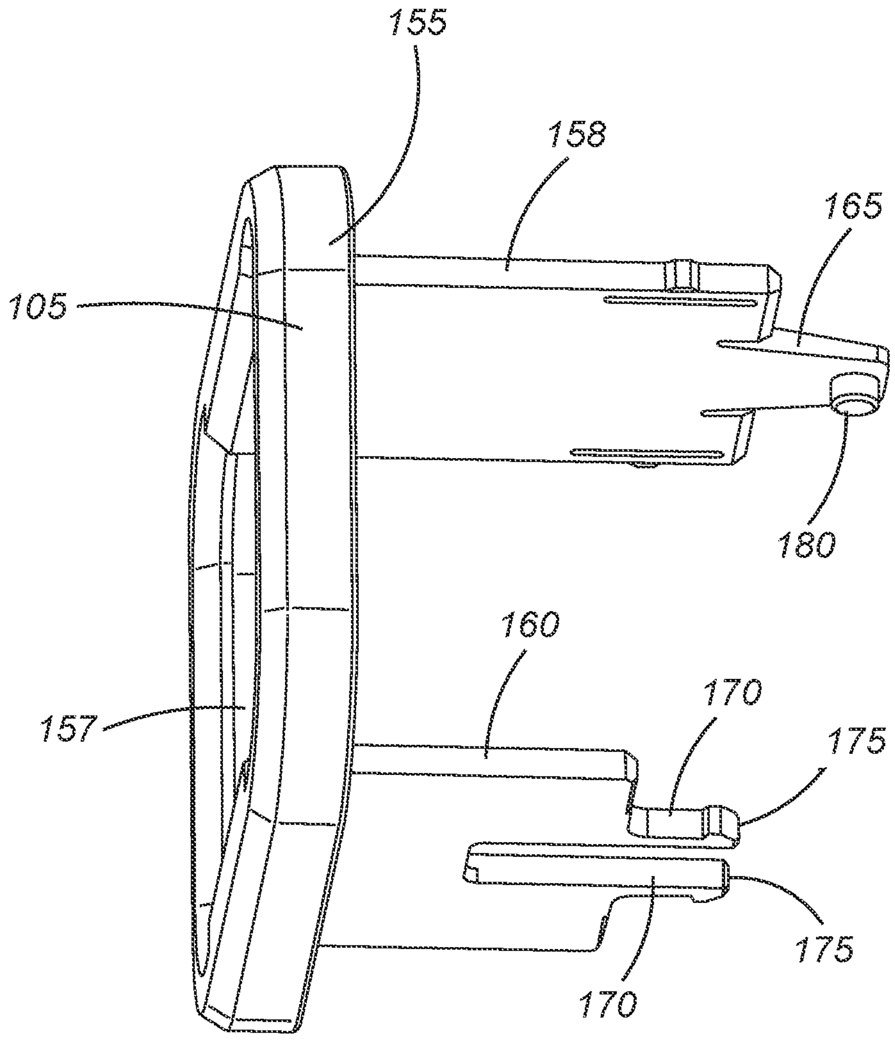
FIG. 5B is a bottom perspective view of the seal retainer of this invention showing a downwardly extending protrusion, which is a part of a CAM linkage mechanism in the operation of the connector assembly system of this invention.

FIG. 5A is a top perspective view of the seal retainer 105 of this invention. The seal retainer 105 includes an end surrounding portion 155 with an opening 157, an upper portion 158, and a lower portion 160. The upper portion 158 includes a centrally extending portion 165, while the lower portion 160 includes a pair of extensions 170, each extension 170 of the lower portion 160 includes, at an end thereof, a barb-like hook member 175. As illustrated in FIG. 5B, the centrally extending portion 165 of the upper portion 158 of the seal retainer 105 of this invention includes a downwardly extending protrusion member 180, which is a part of the CAM linkage mechanism in the operation of the connector assembly system 100 of this invention, as more fully discussed below.

Figure 6A:
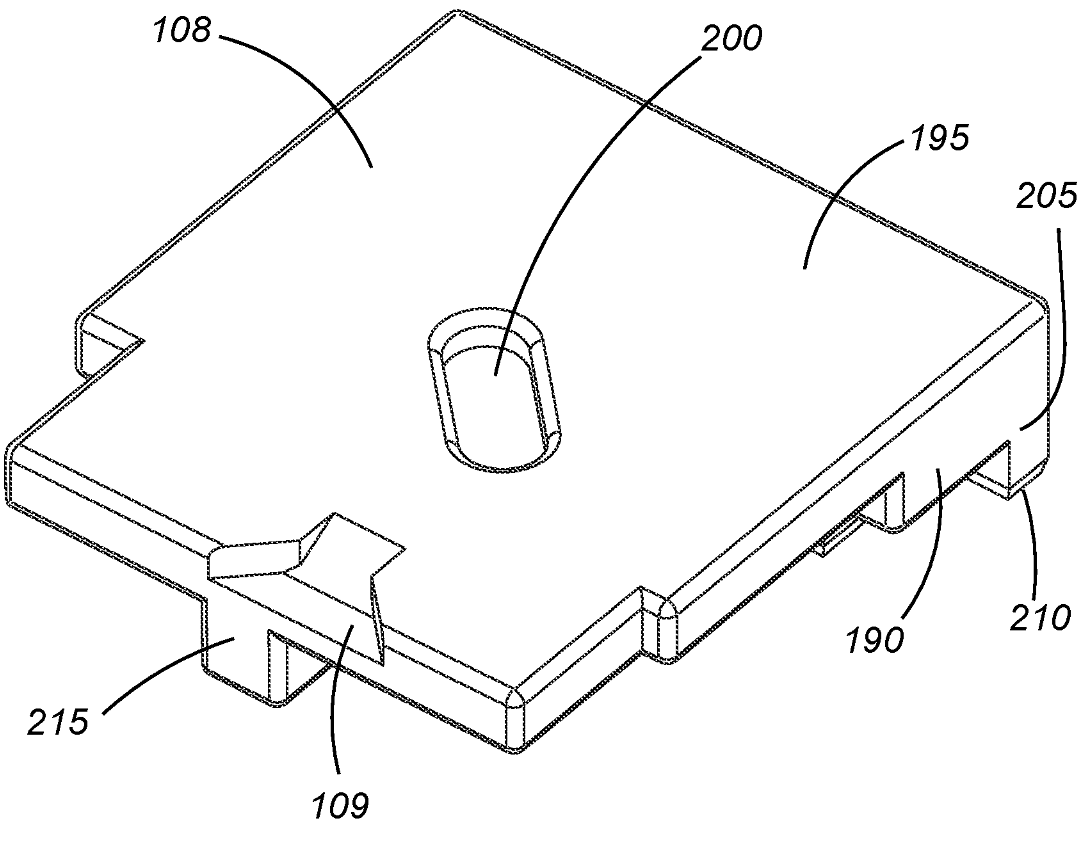

FIG. 6A shows an upper perspective view of the TPA device 108 of the connector assembly 100 of this invention. The TPA device 108 includes an upper portion 190 having an upper surface 195. The upper surface 195 of the upper portion 190 of the TPA device 108 includes thereon a recess 200, which is, although not limited thereto, a substantially oblong-shaped recess 200. At a lower portion 205 of the TPA device 108, at an end thereof, is a first terminal blocking member 210, the function of which is discussed in more detail below. Also illustrated in FIG. 6A is a central downward extending member 215. Also illustrated in FIG. 6A is a guiding ramp or feature 109, adjacent the central downward extending member 215, which ensures that the protrusion member 180 is properly or effectively directed to the upper surface 195 before the protrusion member 180 drops into the closed first end 201 of the recess 200 when the seal retainer 105 is assembled along a second direction to the pre-lock position.

Figure 6B:
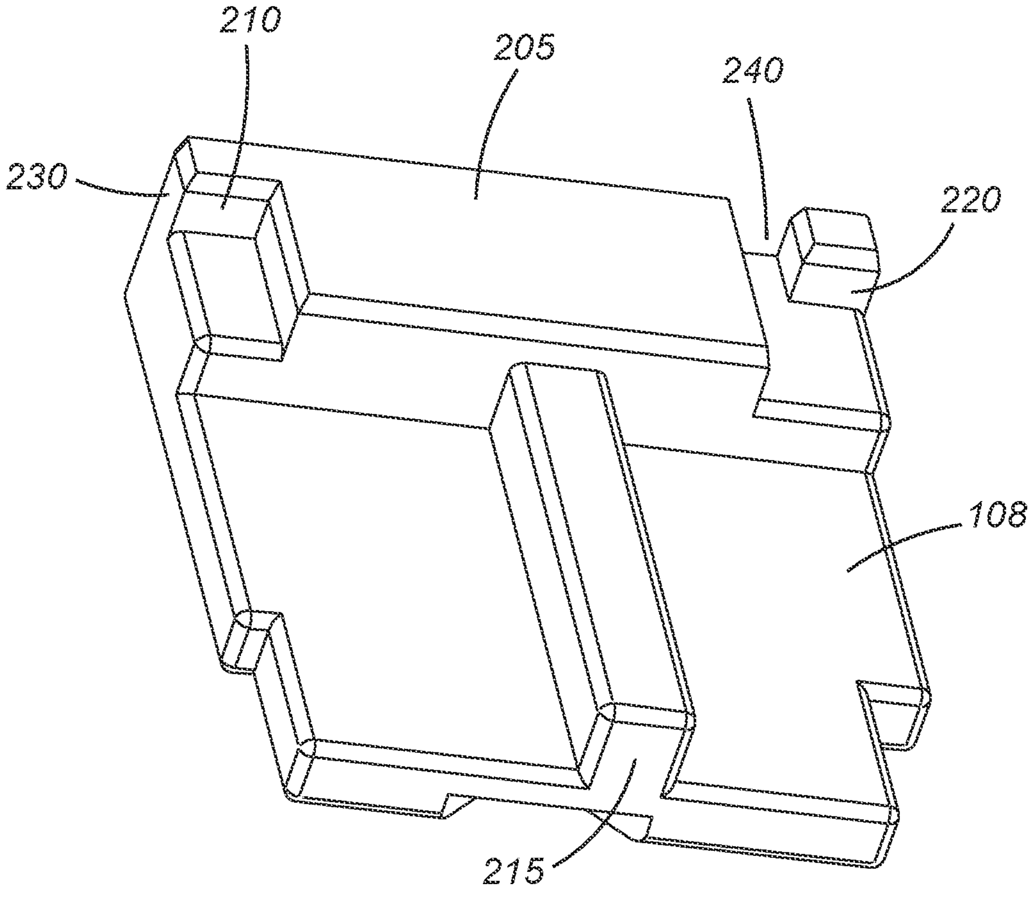
FIG. 6B is a bottom perspective view of the TPA of this invention, which shows a bottom front portion used in blocking terminals when the terminals are in full-lock positions inside an inner housing of the connector assembly of this invention.

FIG. 6B shows a lower perspective view of the TPA device 108, which further shows the lower portion 205, the first terminal blocking member 210, a second terminal blocking member 220, and the central downward extending member 215 thereof. Also illustrated in FIG. 6B are a side 230 of the first terminal blocking member 210 and a terminal passageway 240, which, as more fully explained below, respectively provide the terminals 120, 121 with openings to pass through when the TPA device 108 with the terminals 120, 121 is at a pre-lock position.

Figure 7:
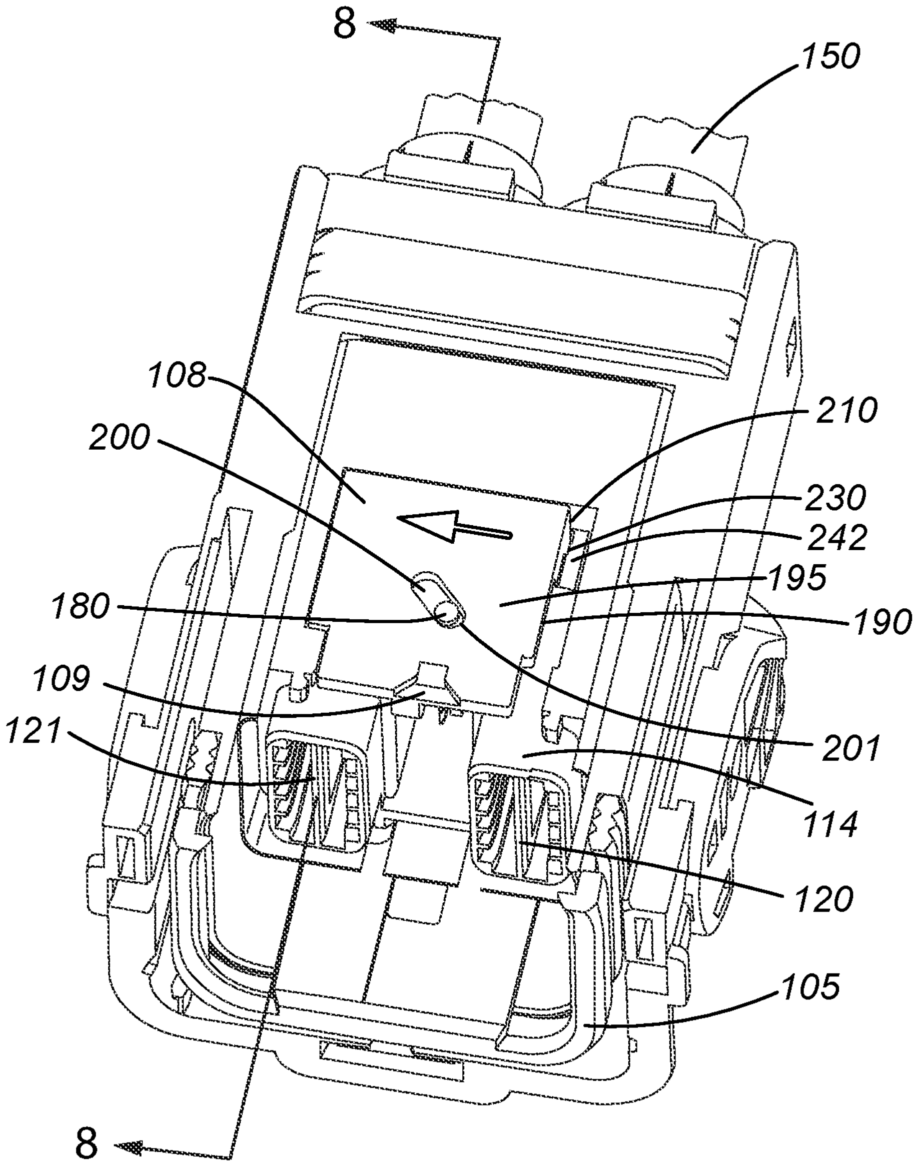
FIG. 7 is a perspective cut-off view of the connector assembly of this invention illustrating the downwardly extending protrusion of the seal retainer within the substantially oblong recess on the upper surface of TPA device at a position where the TPA device with the terminals of the connector assembly of this invention remain at a pre-lock position.
Figure 8:
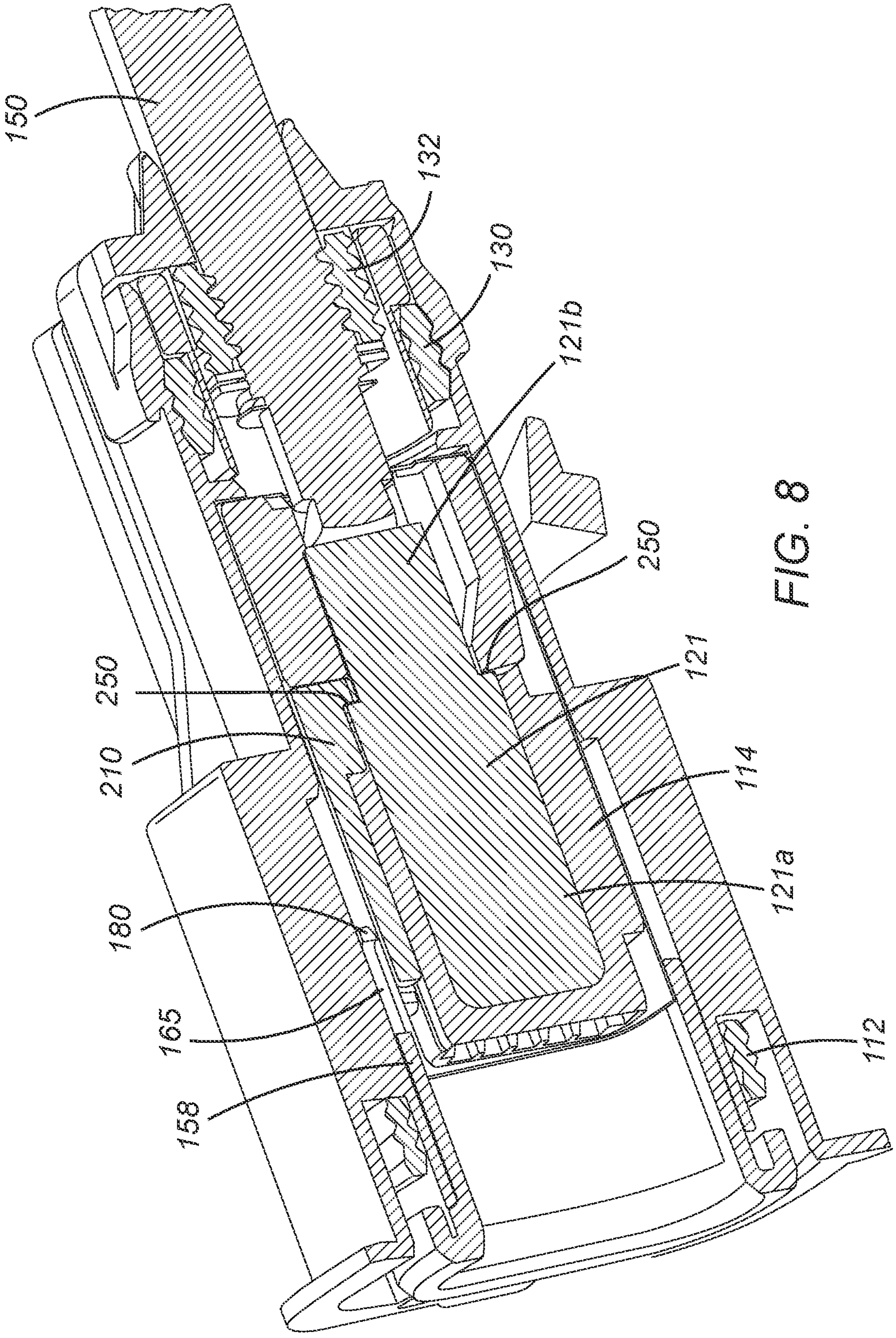
FIG. 8 is a cross-sectional view taken along line 8-8 in FIG. 7 showing the TPA device with a terminal of the connector assembly of this invention at a pre-lock position.

FIG. 7 is an inside view that looks downwards onto the TPA device 108 (more particularly, onto the upper surface 195 of the upper portion 190 of the TPA device 108) relative to the positions of the upper portion and centrally extending portion 165 of the seal retainer 105 above the TPA device 108 (see FIG. 5B). As illustrated in FIG. 7, the downwardly extending protrusion member 180 of the centrally extending portion 165 of the seal retainer 105 (see also FIG. 5B) is fitted inside the substantially oblong-shaped recess 200 above the upper surface 195 of the TPA device 108. As further illustrated in FIG. 7, the terminals 120, 121 are inserted inside the terminal guidance member 114 (see also FIG. 4), the forward end of each of the terminals 120, 121 (or the front portions 120*a*, 121*a*; see FIG. 4) being seen in FIG. 7. When the TPA device 108 is the pre-lock position, as shown in FIGS. 7 and 8, the terminals 120, 121 may still be removed or dislodged from the terminal guidance member 114. The shape of each of the terminals 120, 121 is such that the vertical height of its front portion 120*a*, 121*a* is larger than the vertical height of its rear portion 120*b*, 121*b* (see FIGS. 4 and 8). As can also be seen in FIG. 7, the guiding ramp or feature 109, adjacent the central downward extending member 215, ensures that the protrusion member 180 is properly or effectively directed to the upper surface 195 before the protrusion member 180 drops into the closed first end 201 of the recess 200 when the seal retainer 105 is assembled along a second direction to the pre-lock position.

Illustrated in FIG. 8 is a cross-sectional view taken along line 8-8 in FIG. 7 showing the terminal 120 of the connector assembly 100 of this invention at a pre-lock position when the TPA 108 device is at a pre-lock position. Prior to explaining, in more detail, what is shown in FIG. 8, reference is first made to FIG. 6B, which is the bottom perspective view of the TPA device 108 and shows the first terminal blocking member 210 and the second terminal blocking member 220. Also illustrated in FIG. 6B are the side 230 of the first terminal blocking member 210 and a terminal passageway 240, which, as more fully explained below, respectively provide the terminals 120, 121 with openings to pass therethrough when the TPA device 108 with the terminals 120, 121 is at a pre-lock position. As shown in FIGS. 7 and 8, the seal retainer 105, when inserted into the inner and outer housings 110, 124, has its downwardly extending protrusion member 180 positioned, as shown, at an end 201 of the substantially oblong-shaped recess 200 on the upper surface 195 of the TPA device 108. At this position, the TPA device 108 has been pushed or directed towards the left, as shown in the arrow in FIG. 7. With the TPA device 108 positioned towards the left, as shown in the arrow in FIG. 7, the side 230 of the first terminal blocking member 210 (see FIG. 6B) of the TPA device 108 provides for a terminal passageway 242 for the terminal 120 to pass therethrough (i.e., the terminal 120 is not blocked) a passageway 242 alongside the side 230 of the first terminal blocking member 210. Simultaneously, with the TPA device 108 positioned towards the left, as shown in the arrow in FIG. 7, the second terminal blocking member 220 of the TPA device 108 (see FIG. 6B) similarly does not block the terminal 121, and allows the terminal 121 to pass therethrough the terminal passageway 240 (see FIG. 6B) prior to the TPA device 108 being locked at a pre-lock position.

Figure 9A:
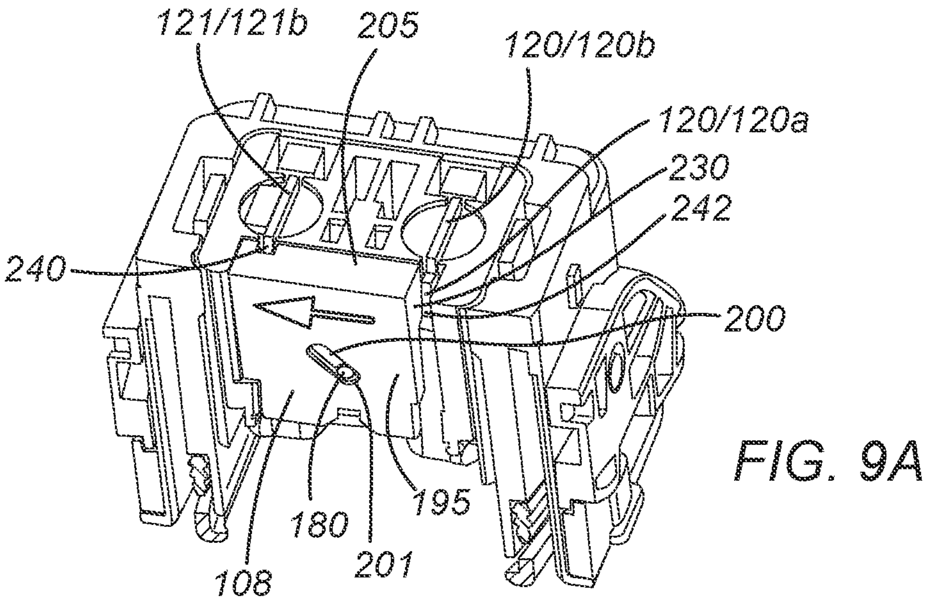
Figure 9B:
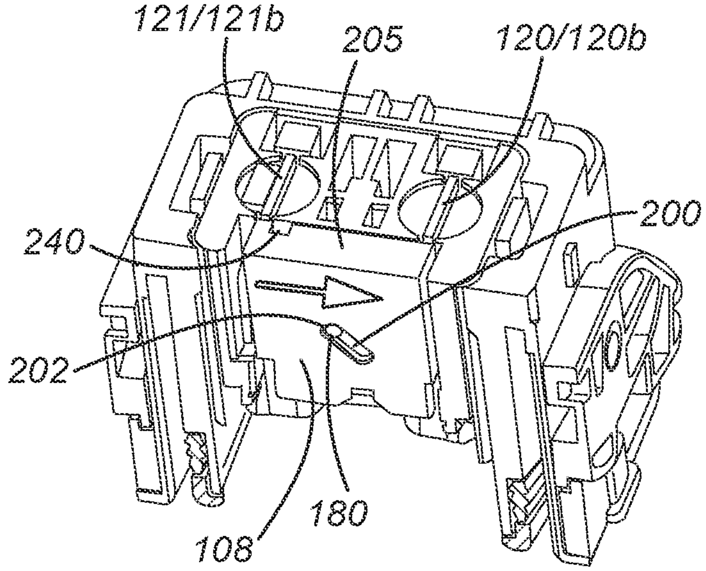
FIG. 9B shows an internal view illustrating the relative locations of the terminals, the downwardly extending protrusion member of the seal retainer, and TPA device with the terminals at a full-lock position.

FIG. 9A shows an internal view illustrating the relative locations of the terminals 120, 121, the downwardly extending protrusion member 180 of the seal retainer 105, and the TPA device 108 (with the terminals 120, 121) at a pre-lock position, while FIG. 9B FIG. shows an internal view illustrating the relative locations of the terminals 120, 121, the downwardly extending protrusion member 180 of the seal retainer 105, and the TPA device 108 (with the terminals 120, 121) at a full-lock position.

The method or operation of the connector assembly 100 of this invention is hereinafter described. As illustrated in FIG. 9A, the downwardly extending protrusion member 180 of the centrally extending portion 165 of the seal retainer 105 (see also FIG. 5B) is fitted inside the substantially oblong-shaped recess 200 above the upper surface 195 of the TPA device 108. More particularly, the downwardly extending protrusion member 180 of the seal retainer 105 is at an end 201 of the substantially oblong-shaped recess 200 on the upper surface 195 of the TPA device 108, which consequently, shifts or moves the TPA device 108 towards the left (as seen in FIG. 9A), such that the terminals 120, 121 are, generally, not blocked by the TPA device 108. In FIG. 9A, the forward end of each of the terminals 120, 121 (or the respective front portions 120*a*, 121*a* thereof) can be seen. At this pre-lock position of the TPA device 108, as illustrated in FIG. 9A, the terminals 120, 121 may still be removed or dislodged from the terminal guidance member 114 through the terminal passageway 240 (for the terminal 121) or the terminal passageway 242 (for the terminal 120).

In other words, the seal retainer 105, when inserted into the inner and outer housings 110, 124 has its downwardly extending protrusion member 180 positioned, as shown in FIG. 9A, at the end 201 of the substantially oblong-shaped recess 200 on the upper surface 195 of the TPA device 108. At this position, the TPA device 108 has been pushed or directed towards the left, as shown in the arrow in FIG. 9A. With the TPA device 108 positioned towards the left, as shown in the arrow in FIG. 9A, the side 230 of the first terminal blocking member 210 of the TPA device 108 provides for a terminal passageway 242 for the terminal 120 to pass through (i.e., the terminal 120 being unblocked) the terminal passageway 242 alongside the side 230 of the first terminal blocking member 210 (see also FIG. 6B). Simultaneously, with the TPA device 108 positioned towards the left, as shown in the arrow in FIG. 9A, the second terminal blocking member 220 of the TPA device 108 (see FIG. 6B) does not block the terminal 121, and allows the terminal 121 to pass through the terminal passageway 240 (see FIG. 6B) when the TPA device 108 is at a pre-lock position.

FIG. 9B shows the same internal view as in FIG. 9A illustrating the relative locations of the terminals 120, 121, the downwardly extending protrusion member 180 of the seal retainer 105, and the TPA device 108 (with the terminals 120, 121) at the full-lock position. That is, as is clearly illustrated in FIG. 9B, the downwardly extending protrusion member 180 of the centrally extending portion 165 of the seal retainer 105 (see also FIG. 5B) is fitted inside the substantially oblong-shaped recess 200 above the upper surface 195 of the TPA device 108. More particularly, the downwardly extending protrusion member 180 of the seal retainer 105 is at an end 202 of the substantially oblong-shaped recess 200 on the upper surface 195 of the TPA device 108, which consequently, shifts or moves the TPA device 108 towards the right (as seen in FIG. 9B), such that the terminals 120, 121 are, generally, blocked by the TPA device 108. In FIG. 9B, the forward end of each of the terminals 120, 121 can be seen, but at this full-lock position of the TPA device 108, as illustrated in FIG. 9B, the terminals 120, 121 cannot be removed or dislodged from the terminal guidance member 114.

In other words, the seal retainer 105, when further inserted into the inner and outer housings 110, 124 has its downwardly extending protrusion member 180 positioned, as shown in FIG. 9B, at the end 202 of the substantially oblong-shaped recess 200 on the upper surface 195 of the TPA device 108. At this position, the TPA device 108 has been pushed or directed towards the right, as shown in the arrow in FIG. 9B. With the TPA device 108 positioned towards the right, as shown in the arrow in FIG. 9B, the first terminal blocking member 210 (see FIG. 6B) of the TPA device 108 blocks the transition portion 250 (see FIGS. 4 and 11) between the front portion 120*a* and the rear portion 120 of the terminal 120, while the second terminal blocking member 220 (see FIG. 6B) of the TPA device 108 simultaneously blocks the transition portion 260 (see FIG. 4) between the front portion 121*a* and the rear portion 121*b* of the terminal 121.

Figure 10:
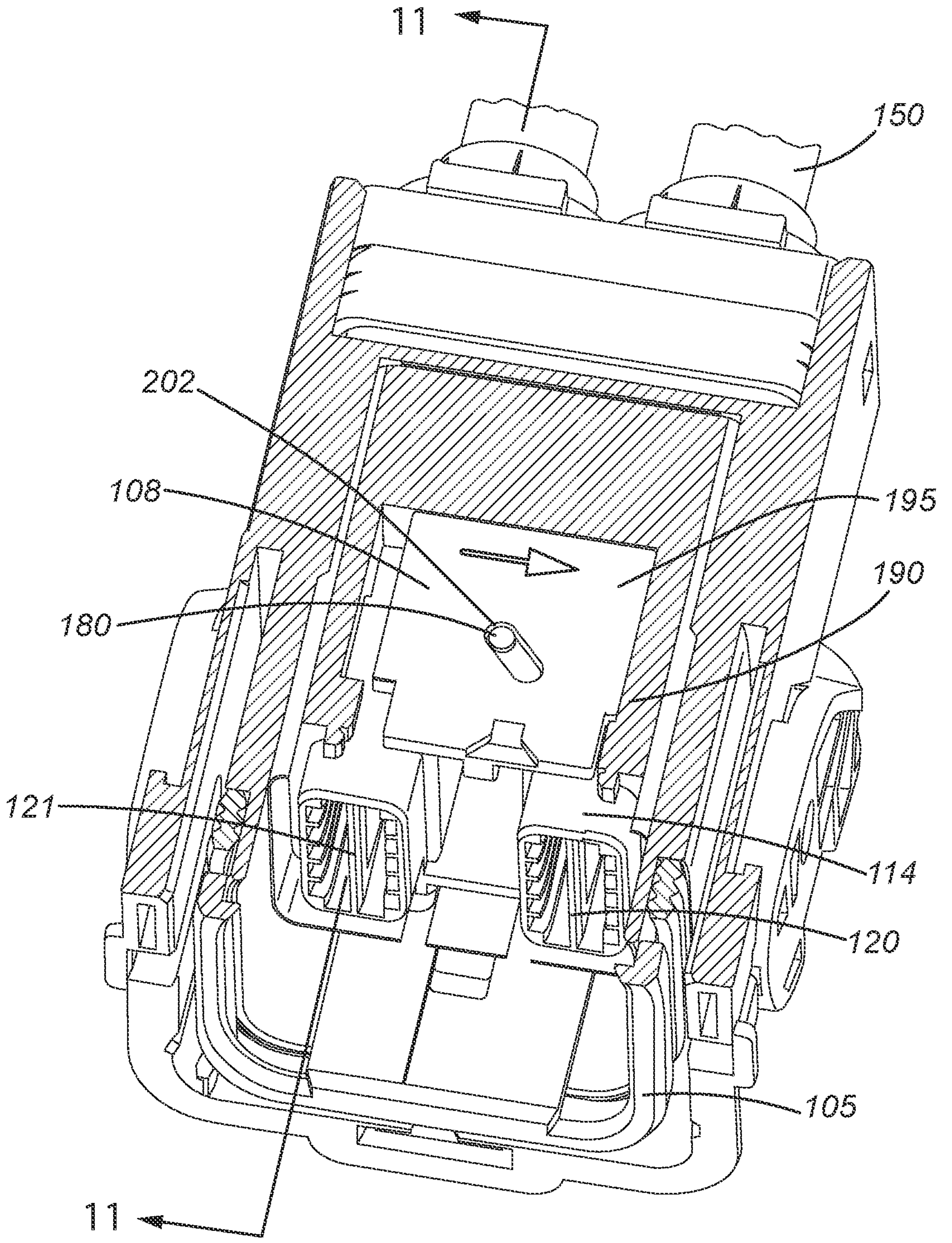
FIG. 10 is a perspective cut-off view of the connector assembly of this invention illustrating the downwardly extending protrusion of the seal retainer within the substantially oblong recess on the upper surface of TPA device at a position where the TPA device with the terminals of the connector assembly of this invention remain at a full-lock position.
Figure 11:
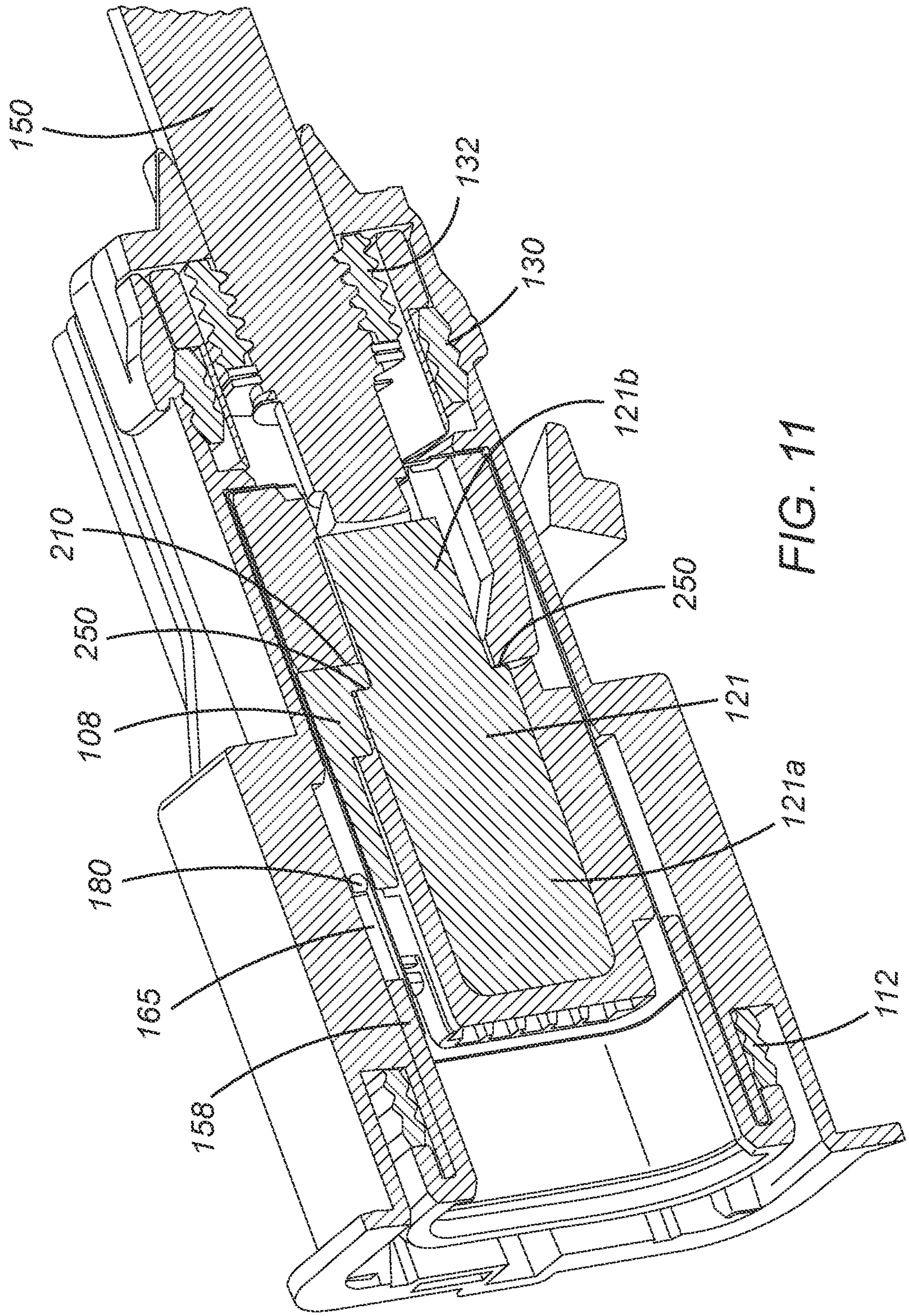
FIG. 11 is a cross-sectional view taken along line 11-11 in FIG. 10 showing the TPA device with a terminal of the connector assembly of this invention at a full-lock position.

FIG. 10 is an inside view that looks downwards onto the TPA device 108 (more particularly, onto the upper surface 195 of the upper portion 190 of the TPA device 108) relative to the positions of the upper portion and centrally extending portion 165 of the seal retainer 105 above the TPA device 108. As is clearly seen in FIG. 10, the downwardly extending protrusion member 180 of the centrally extending portion 165 of the seal retainer 105 (see also FIG. 5B) is fitted inside the substantially oblong-shaped recess 200 above the upper surface 195 of the TPA device 108. As further illustrated in FIG. 10, the terminals 120, 121 are inserted inside the terminal guidance member 114 (see also FIGS. 4, and 12-14), the forward end of each of the terminals 120, 121 (or the front portion 120*a*, 121*a* thereof) being seen in FIG. 10. At the full-lock positions, as shown in FIGS. 10 and 11 and as more fully discussed below, the terminals 120, 121 become locked within the terminal guidance member 114 and the outer housing 124. It is again important to note that the shape of each of the terminals 120, 121 is such that the vertical height of its front portion 120*a*, 121*a* is larger the vertical height of its respective rear portion 120*b*, 121*b* (see FIGS. 4 and 11).

Illustrated in FIG. 11 is a cross-sectional view taken along line 11-11 in FIG. 10 showing the TPA device 108 with the terminal 120 of the connector assembly 100 at a full-lock position. Prior to explaining, in more detail, what is shown in FIG. 11, reference is again made to FIG. 6B, which is the bottom perspective view of the TPA device 108, which shows the first terminal blocking member 210 and the second terminal blocking member 220. Also illustrated in FIG. 6B are the side 230 of the first terminal blocking member 210 and the terminal passageway 240, which, as discussed above, respectively provide the terminals 120, 121 with openings to pass through when the TPA device 108 with the terminals 120, 121 is at a pre-lock position. As shown in FIGS. 10 and 11, the seal retainer 105, when inserted into the inner and outer housings 110, 124 has its downwardly extending protrusion member 180 positioned, as shown, at an end 202 of the substantially oblong-shaped recess 200 on the upper surface 195 of the TPA device 108. At this position, the TPA device 108 has been pushed or directed towards the right, as shown in the arrow in FIG. 10. With the TPA device 108 positioned towards the right, as shown in the arrow in FIG. 10, the second terminal blocking member 220 of the TPA device 108 blocks the front portion 121*a* of the terminal 121. More particularly, a transition portion 250 between the front portion 121*a* and the rear portion 121*b* of the terminal 121 is blocked by the second terminal blocking member 220 of the TPA device 108.

At this position of the TPA device 108 with the TPA device 108 positioned towards the right, as shown in the arrow in FIG. 10, the first terminal blocking member 210 of the TPA device 108 similarly and simultaneously blocks the front portion 120*a* of the terminal 120. More particularly, a transition portion 260 between the front portion 120*a* and the rear portion 120*b* of the terminal 120 is blocked by the first terminal blocking member 210 of the TPA device 108. In other words, with the TPA device 108 positioned towards the right, as shown in the arrow in FIG. 10, the first terminal blocking member 210 and the second terminal blocking member 220 of the TPA device 108 (see FIG. 6B) simultaneously block the front portion 120*a* of the terminal 120 and the front portion 121*a* of the terminal 121, respectively. Consequently, the TPA device 108 and the terminals 120, 121 are at full-lock positions.

Figure 12:
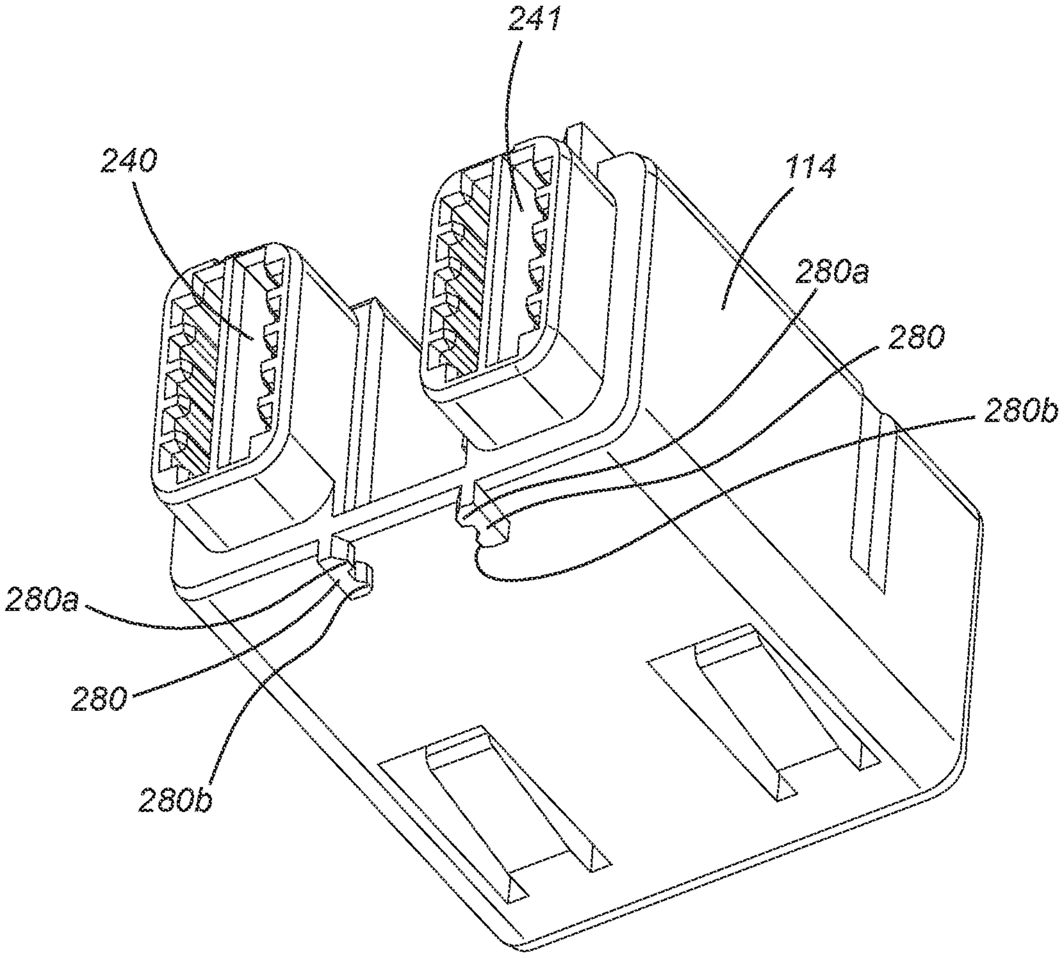
FIG. 12 is a bottom perspective view of a terminal guidance member showing a mating locking member thereon for receiving therein a set of barb-like hook members extending from a lower portion of the seal retainer of this invention.
Figure 13:
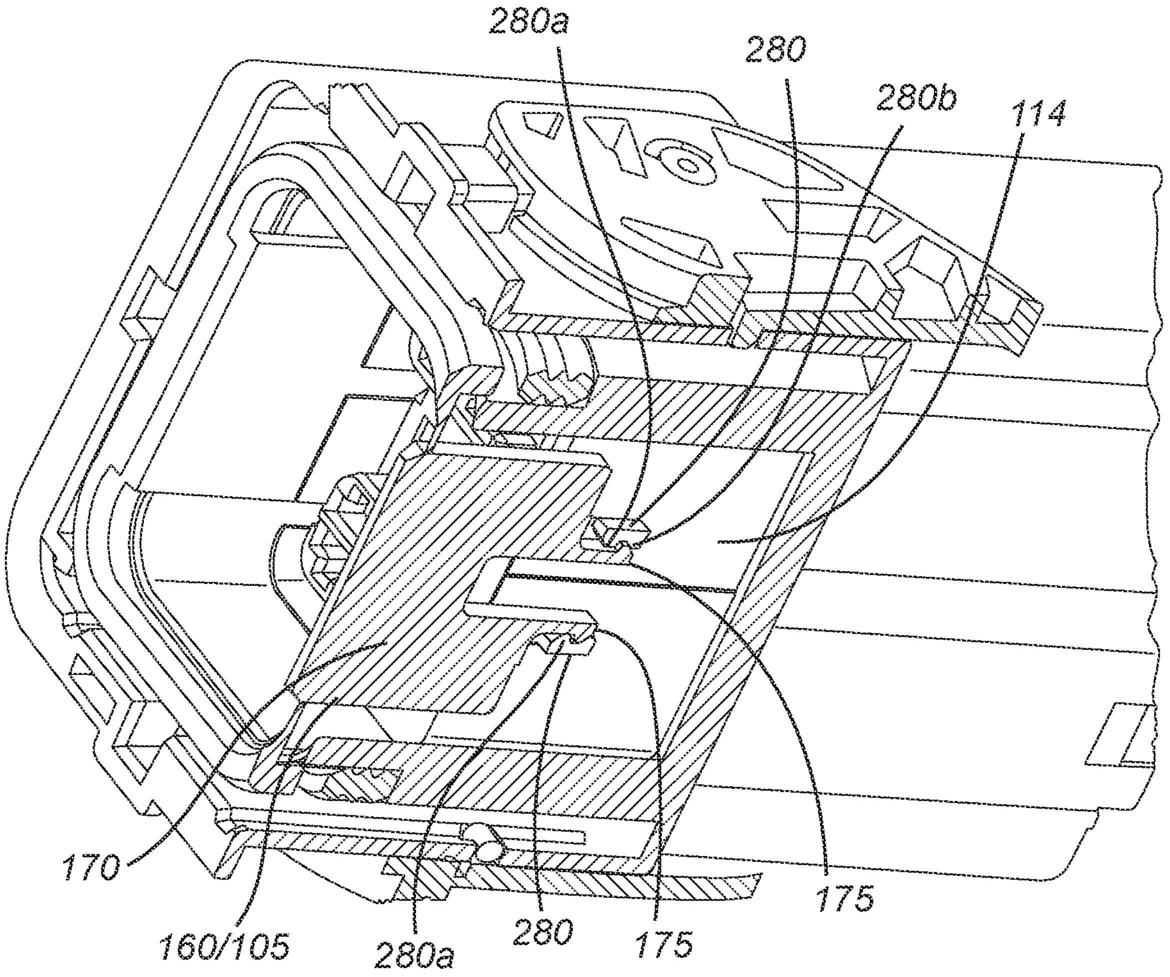
FIG. 13 shows a mating view of the set of barb-like hook members extending from the lower portion of the seal retainer when engaged with the mating locking member of the terminal guidance member when the TPA device is at a pre-lock position.

FIG. 12 shows the bottom perspective view of the terminal guidance member 114 having a pair of mating locking members 280 thereon for receiving therein a pair of barb-like hook members 175 extending from the lower portion 160 of the seal retainer 105 (see also FIGS. 5A and 5B). Also shown in FIG. 12 are terminal passageways 240, 241 for accommodating therein the terminals 121, 120, respectively. The pair of mating locking members 280 of the terminal guidance member 114 operates in such a way that the front members 280*a* thereof receive the pair of barb-like hook members 175 when the TPA device 108 (and thus, the terminals 120, 121) is pushed or inserted into the inner housing 110 (or the outer housing 124) at a pre-lock position (see FIGS. 7, 8, and 13). That is, at pre-lock positions of the TPA device 108 and the terminals 120, 121, the pair of barb-like hook members 175 extending from the lower portion 160 of the seal retainer 105 engages with the front members 280*a* of the pair of mating locking members 280 of the terminal guidance member 114, as illustrated in FIG. 13. Consequently, at this time, the TPA device 108 (and thus, the terminals 120, 121) is locked at a pre-lock position (see also FIGS. 7 and 8).

Figure 14:
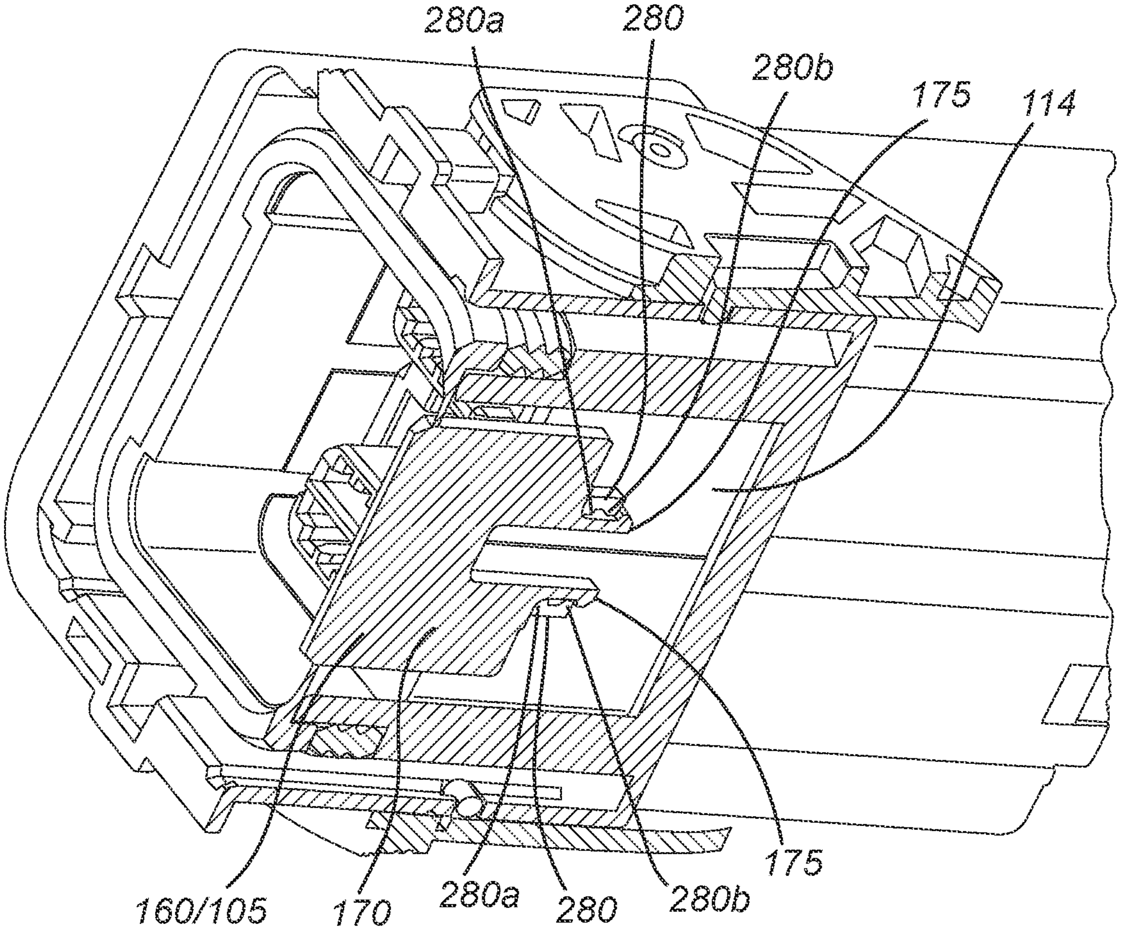
FIG. 14 shows a mating view of the set of barb-like hook members extending from the lower portion of the seal retainer when engaged with the mating locking member of the terminal guidance member when the TPA device is at a full-lock position.

When the TPA device 108 (and thus, the terminals 120, 121) is pushed or inserted further into the inner housing 110 (or the outer housing 124) at a full-lock position (see FIGS. 10, 11, and 14), the pair of mating locking members 280 of the terminal guidance member 114 continue to receive the pair of barb-like hook members 175 of the TPA device 108, and the pair of barb-like hook members 175 extending from the lower portion 160 of the seal retainer 105 engages with the rear members 280*b* of the pair of mating locking members 280 of the terminal guidance member 114, as illustrated in FIG. 14. Consequently, at this time, the TPA device 108 (and thus, the terminals 120, 121) is at a full-lock position (see also FIGS. 10 and 11).

The present invention is not limited to the above-described embodiments; and various modifications in design, structural arrangement or the like may be used without departing from the scope or equivalents of the present invention.

I claim:

1. A connector assembly, comprising:
- a terminal position assurance (TPA) device having a recess on a surface thereof and at least a terminal blocking member extending therefrom;
- a seal retainer having a protrusion that fits inside said recess of said TPA device;
- at least a terminal; and
- a housing for accommodating therein said terminal,
- wherein said seal retainer is operably connected to said TPA device via a cam linkage mechanism, and
- wherein said seal retainer moves along in a first direction and activates said TPA device so as to move along in a second direction, which is substantially perpendicular to the first direction.

2. The connector assembly according to claim 1,
- wherein said TPA device moves from a first position to a second position in the second direction,
- wherein said first position of said TPA device is at a pre-lock position such that said terminal remains unblocked inside said housing, and
- wherein said second position of said TPA device is at a full-lock position such that said TPA device blocks said terminal inside said housing.

3. The connector assembly according to claim 2, wherein said recess of said TPA device extends at an angle relative to said first direction along which said seal retainer travels.

4. The connector assembly according to claim 2, wherein said recess of said TPA device extends at an angle relative to said second direction along which said TPA device travels.

5. The connector assembly according to claim 2, wherein said TPA device provides at least a terminal passageway for said terminal when said terminal remains at an unblocked state and said TPA device is at a pre-lock position.

6. The connector assembly according to claim 2, wherein said TPA device comprises at least a terminal blocking member that blocks said terminal when said protrusion of said TPA device is at said second position within said recess of said TPA device and when said TPA device is at a full-lock position.

7. The connector assembly according to claim 6, wherein said terminal has a front portion having a first vertical height and a second portion having a second vertical height, wherein said first vertical height is larger than said second vertical height.

8. The connector assembly according to claim 7, wherein said terminal blocking member of said TPA device blocks a transition portion of said terminal, said transition portion of said terminal is located between said front portion and said rear portion thereof.

9. A method for cam actuating a terminal position assurance (TPA) device by a seal retainer in a connector assembly, comprising the steps of:

installing a protrusion portion of said seal retainer into a recess on an outside surface of said TPA device, said recess extending along a first direction;

pushing or inserting said seal retainer along a second direction into a housing of said connector assembly;

moving said protrusion of said seal retainer from a first end of said recess towards a second end of said recess;

moving said TPA device along a third direction that is substantially perpendicular to the second direction along which said seal retainer is pushed or inserted; and locking at least a terminal by a terminal blocking member of said TPA device.

10. The method for cam actuating said TPA device by said seal retainer in said connector assembly according to claim 9, wherein said TPA device is at a pre-lock position when said protrusion of said seal retainer is at said first end of said recess of said TPA device, and wherein said TPA device is at a full-lock position when said protrusion of said seal retainer is at said second end of said recess of said TPA device.

11. The method for cam actuating said TPA device by said seal retainer in said connector assembly according to claim 10, further comprising the step of locking said TPA device onto an inner housing at a first locking position when said TPA device is at a pre-lock position.

12. The method for cam actuating said TPA device by said seal retainer in said connector assembly according to claim 11, further comprising the step of locking said TPA device onto said inner housing at a second locking position when said TPA device is at a full-lock position.

13. The method for cam actuating said TPA device by said seal retainer in said connector assembly according to claim 11, wherein said terminal remains unblocked within said housing when said TPA device is at said pre-lock position.

14. The method for cam actuating said TPA device by said seal retainer in said connector assembly according to claim 12, wherein said terminal is locked with said housing when said TPA device is at said full-lock position.

15. The method for cam actuating said TPA device by said seal retainer in said connector assembly according to claim 9, wherein said first direction along which said recess extends on said outside surface of said TPA device, said second direction along which said seal retainer is pushed or inserted into said housing of said connector assembly, and said third direction along which said TPA device moves are different directions.

16. A method for cam actuating a device by a component in an assembly, comprising the steps of:

installing a protrusion portion of said component to said device, said device having a guiding element to direct said protrusion to an outer surface of said device towards a recess on an outside surface of said device, said recess extending along a first direction;

pushing or inserting said component along a second direction into said assembly, said second direction extending in a direction along which terminals of said assembly substantially extend;

moving said protrusion of said component from a closed first end of said recess towards a second end of said recess;

moving said device along a third direction that is substantially perpendicular to the second direction along which said component is pushed or inserted.

17. The method for cam actuating said device by said component in said assembly according to claim 16, wherein said device is at a pre-lock position when said protrusion of said component is at said first end of said recess of said device, and wherein said device is at a full-lock position when said protrusion of said component is at said second end of said recess of said device.

18. The method for cam actuating said device by said component in said assembly according to claim 17, further comprising the step of locking said device onto said assembly at a first locking position when said device is at a pre-lock position.

19. The method for cam actuating said device by said component in said assembly according to claim 18, further comprising the step of locking said device onto said assembly at a second locking position when said device is at a full-lock position.

20. The method for cam actuating said device by said component in said assembly according to claim 16, wherein said first direction along which said recess extends on said outside surface of said device, said second direction along which said component is pushed or inserted into said assembly, and said third direction along which said device moves are different directions.

21. The method for cam actuating a device by a component in an assembly, according to claim 16 wherein said component is at a pre-lock position when said protrusion of said component is at a first end of said recess.

* * * * *